United States Patent [19]

Blase

[11] Patent Number: 5,460,222

[45] Date of Patent: Oct. 24, 1995

[54] AIR RENEWAL DEVICE

[76] Inventor: Waldemar H. Blase, 3001 N. 103rd Ave., Avondale, Ariz. 85323

[21] Appl. No.: 303,818

[22] Filed: Sep. 9, 1994

[51] Int. Cl.⁶ ............................. F24H 3/02; F24H 3/10; F24F 12/00
[52] U.S. Cl. ............................ 165/54; 165/135; 165/164
[58] Field of Search .............................. 165/54, 164, 165, 165/135, 109.1

[56] References Cited

U.S. PATENT DOCUMENTS

| 2,087,835 | 7/1937 | Buehler, Jr. | 165/164 |
| 5,036,906 | 8/1991 | Rylewski | 165/164 |
| 5,078,208 | 1/1992 | Urch | 165/54 |
| 5,239,834 | 8/1993 | Travers | 165/54 |

FOREIGN PATENT DOCUMENTS

| 0040890 | 12/1981 | European Pat. Off. | 165/165 |
| 1253638 | 1/1961 | France | 165/165 |
| 2367265 | 6/1978 | France | 165/165 |
| 0005040 | 1/1977 | Japan | 165/164 |
| 8204761 | 7/1984 | Netherlands | 165/165 |

*Primary Examiner*—John K. Ford

[57] ABSTRACT

A air renewal device comprising: a box in a generally rectangular configuration, the box having large parallel side walls and short parallel end walls coupled in a rectangular configuration, the box also having upper and lower parallel walls coupling the end and side walls; one wall having a first aperture for the receipt of stale air from a building and a second aperture for the exhaust of stale air to exterior of the building; a third aperture in one of the end walls adjacent to the first aperture for the exhaust of fresh outside air into the home and a fourth aperture adjacent to the second aperture for the receipt of fresh outside air; a plurality of downwardly extending spacer bars extending downwardly from the top wall interior of the device to a location spaced from the bottom wall and a plurality of upwardly extending walls extending upwardly from the bottom wall to a location spaced from the top wall to thereby define a labyrinth within the box; a divider panel located within the box at the midpoint between the path of the labyrinth thereby separating the labyrinth into two parallel flow paths, one flow path extending from the first aperture to the second aperture for the passage of stale air from the building to exterior of the building and a second flow path from the fourth aperture to the third aperture for the passage of fresh air from outside of the building to inside of the building whereby the passage of air along their flow paths will effect the transfer of thermal energy from the air of one flow path to the air of the other flow path as the thermal energy is conducted through the divider panel; and the walls of the box and the spacer bars being fabricated of a thermally insulated elastomeric material and the divider panel being fabricated of a thermally conductive material.

2 Claims, 4 Drawing Sheets

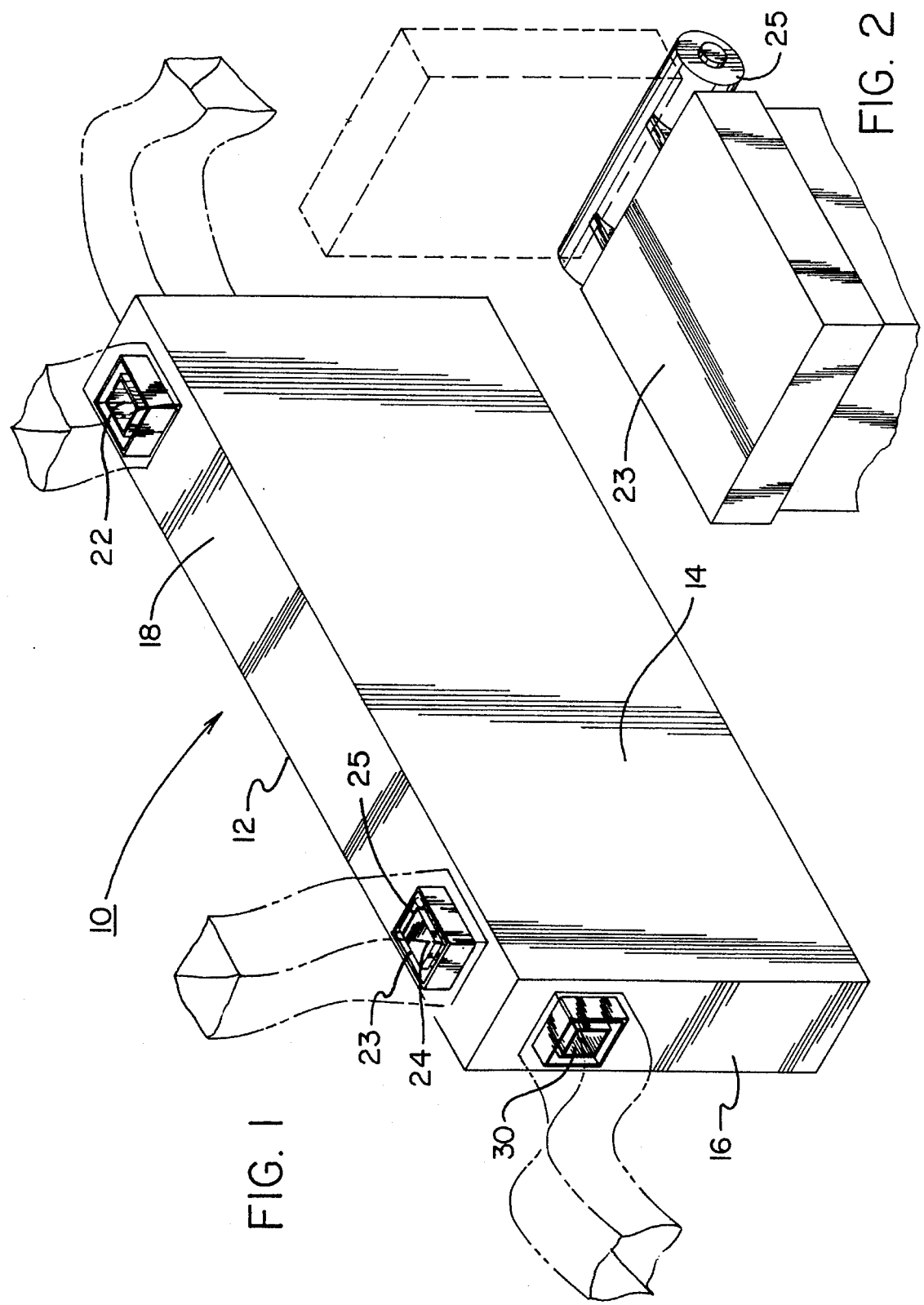

AIR RENEWAL DEVICE

BACKGROUND OF THE INVENTION

1. Field of the Invention

The present invention relates to an air renewal device and more particularly pertains to transferring the heat from stale air leaving a home to fresh air entering the home.

2. Description of the Prior Art

The use of apparatuses for conditioning air in buildings for greater comfort through a wide variety of methods and apparatuses is known in the prior art. More specifically, apparatuses for conditioning air in buildings for greater comfort through a wide variety of methods and apparatuses heretofore devised and utilized for the purpose of rendering air in buildings more comfortable through known methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,184,416 to Koontz a combination thermal insulation stop and ventilation baffle article.

U.S. Pat. No. 4,214,510 to Ward discloses a vent and baffle unit.

U.S. Pat. No. 4,265,060 to Woodhams discloses a ventilation baffle.

U.S. Pat. No. 4,664,024 discloses a thermally insulated window having ventilation ducts.

Lastly, U.S. Pat. No. 5,007,216 to Pearson discloses a ventilation baffle and insulation stop.

In this respect, the air renewal device according to the present invention substantially departs from the conventional concepts and designs of the prior art, and in so doing provides an apparatus primarily developed for the purpose of transferring the heat from stale air leaving a home to fresh air entering the home.

Therefore, it can be appreciated that there exists a continuing need for a new and improved air renewal device which can be used for transferring the heat from stale air leaving a home to fresh air entering the home. In this regard, the present invention substantially fulfills this need.

SUMMARY OF THE INVENTION

In view of the foregoing disadvantages inherent in the known types of apparatuses for conditioning air in buildings for greater comfort through a wide variety of methods and apparatuses now present in the prior art, the present invention provides an improved air renewal device. As such, the general purpose of the present invention, which will be described subsequently in greater detail, is to provide a new and improved air renewal device apparatus and method which has all the advantages of the prior art and none of the disadvantages.

To attain this, the present invention essentially comprises a new and improved air renewal device comprising, in combination: a box in a generally rectangular configuration, the box having large parallel side walls and short parallel end walls coupled in a rectangular configuration, the box also having upper and lower parallel walls coupling the end and side walls; the upper wall having a first aperture adjacent to one end wall thereof for the receipt of stale air from a building and a second aperture adjacent to the other end wall thereof for the exhaust of stale air to exterior of the building; a third aperture in one of the end walls adjacent to the first aperture for the exhaust of fresh outside air into the home and a fourth aperture in the other of the end walls adjacent to the second aperture for the receipt of fresh outside air; a plurality of downwardly extending spacer bars extending downwardly from the top wall interior of the device to a location spaced from the bottom wall and a plurality of upwardly extending walls extending upwardly from the bottom wall to a location spaced from the top wall to thereby define a labyrinth within the box; a divider panel located within the box at the midpoint between the path of the labyrinth thereby separating the labyrinth into two parallel flow paths, one flow path extending from the first aperture to the second aperture for the passage of stale air from the building to exterior of the building and a second flow path from the fourth aperture to the third aperture for the passage of fresh air from outside of the building to inside of the building whereby the passage of air along their flow paths will effect the transfer of thermal energy from the air of one flow path to the air of the other flow path as the thermal energy is conducted through the divider panel; the walls of the box and the spacer bars being fabricated of a thermally insulated elastomeric material and the divider panel being fabricated of a thermally conductive material; and a plurality of laterally extending diverter plates within each of the flow paths to provide turbulence to the air passing therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved air renewal device which has all the advantages of the prior art apparatuses for conditioning air in buildings for greater comfort through a wide variety of methods and apparatuses and none of the disadvantages.

It is another object of the present invention to provide a new and improved air renewal device which may be easily and efficiently manufactured and marketed.

It is a further object of the present invention to provide a new and improved air renewal device which is of a durable and reliable construction.

An even further object of the present invention is to provide a new and improved air renewal device which is susceptible of a low cost of manufacture with regard to both materials and labor, and which accordingly is then susceptible of low prices of sale to the consuming public, thereby making such apparatuses for conditioning air in buildings for greater comfort through a wide variety of methods and apparatuses economically available to the buying public.

Still yet another object of the present invention is to provide a new and improved air renewal device which provides in the apparatuses and methods of the prior art some of the advantages thereof, while simultaneously overcoming some of the disadvantages normally associated therewith.

Still another object of the present invention is to transfer the heat from stale air leaving a home to fresh air entering the home.

Lastly, it is an object of the present invention to provide a new and improved air renewal device comprising: a box in a generally rectangular configuration, the box having large parallel side walls and short parallel end walls coupled in a rectangular configuration, the box also having upper and lower parallel walls coupling the end and side walls; one wall having a first aperture for the receipt of stale air from a building and a second aperture for the exhaust of stale air to exterior of the building; a third aperture in one of the end walls adjacent to the first aperture for the exhaust of fresh outside air into the home and a fourth aperture adjacent to the second aperture for the receipt of fresh outside air; a plurality of downwardly extending spacer bars extending downwardly from the top wall interior of the device to a location spaced from the bottom wall and a plurality of upwardly extending walls extending upwardly from the bottom wall to a location spaced from the top wall to thereby define a labyrinth within the box; a divider panel located within the box at the midpoint between the path of the labyrinth thereby separating the labyrinth into two parallel flow paths, one flow path extending from the first aperture to the second aperture for the passage of stale air from the building to exterior of the building and a second flow path from the fourth aperture to the third aperture for the passage of fresh air from outside of the building to inside of the building whereby the passage of air along their flow paths will effect the transfer of thermal energy from the air of one flow path to the air of the other flow path as the thermal energy is conducted through the divider panel; and the walls of the box and the spacer bars being fabricated of a thermally insulated elastomeric material and the divider panel being fabricated of a thermally conductive material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the new and improved air renewal device constructed in accordance with the principles of the present invention.

FIG. 2 is a perspective illustration of one of the openings and an associated spring-urged door.

The same reference numerals refer to the same parts throughout the various Figures.

DESCRIPTION OF THE PREFERRED EMBODIMENT

Figure 3:
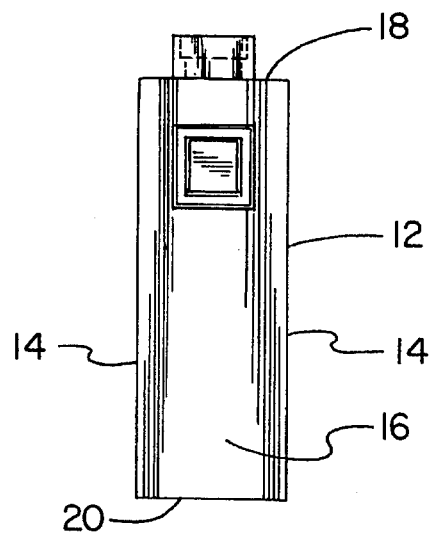
FIG. 3 is a side elevational view of the device shown in FIG. 1.

With reference now to the drawings, and in particular to FIG. 1 thereof, a new and improved air renewal device embodying the principles and concepts of the present invention and generally designated by the reference numeral 10 will be described.

The present invention, the new and improved air renewal device is a system comprised of a plurality of components. Such components, in their broadest context, include a box, a plurality of apertures, spacer bars, and diverter plates. Such individual components are specifically configured and correlated one with respect to the other so as to attain the desired objectives.

Figure 4:
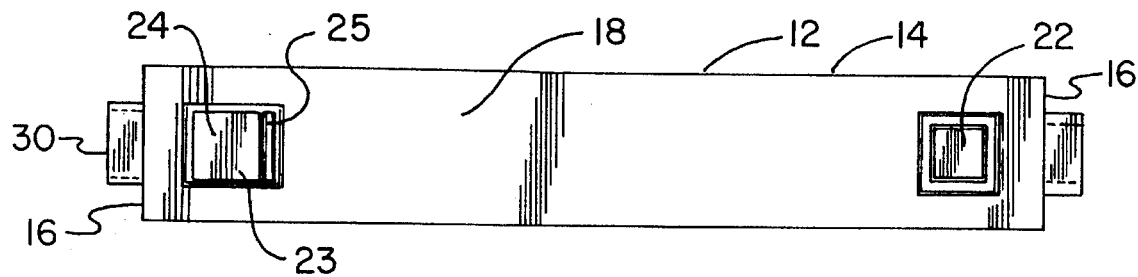
FIG. 4 is a top elevational view of the device shown in FIGS. 1 and 2.
Figure 5:
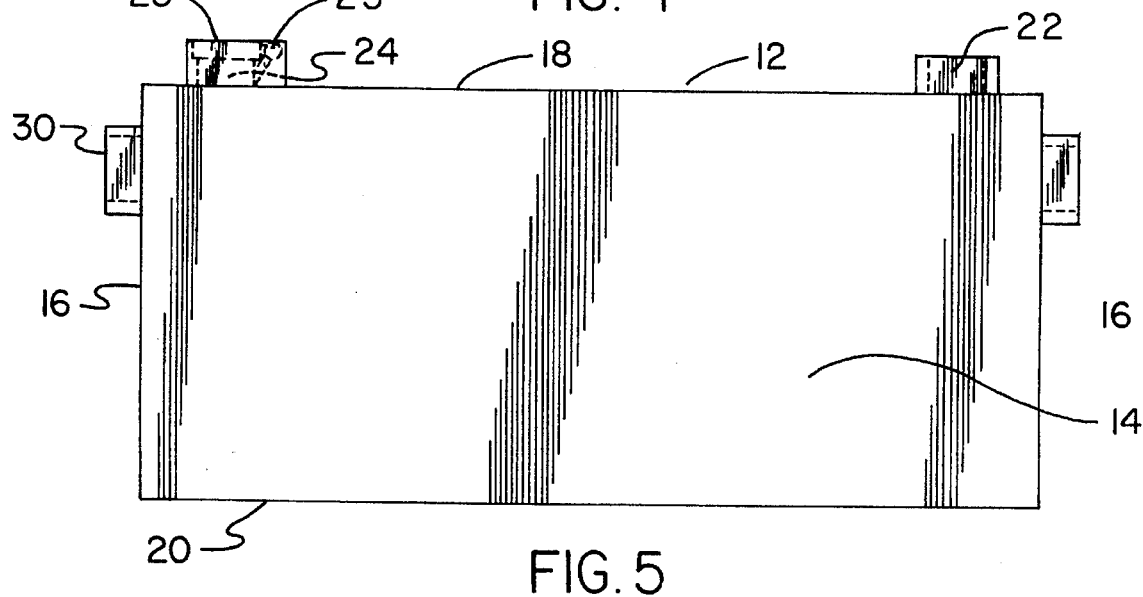
FIG. 5 is a front elevational view of the device of the prior Figure.
Figure 6:
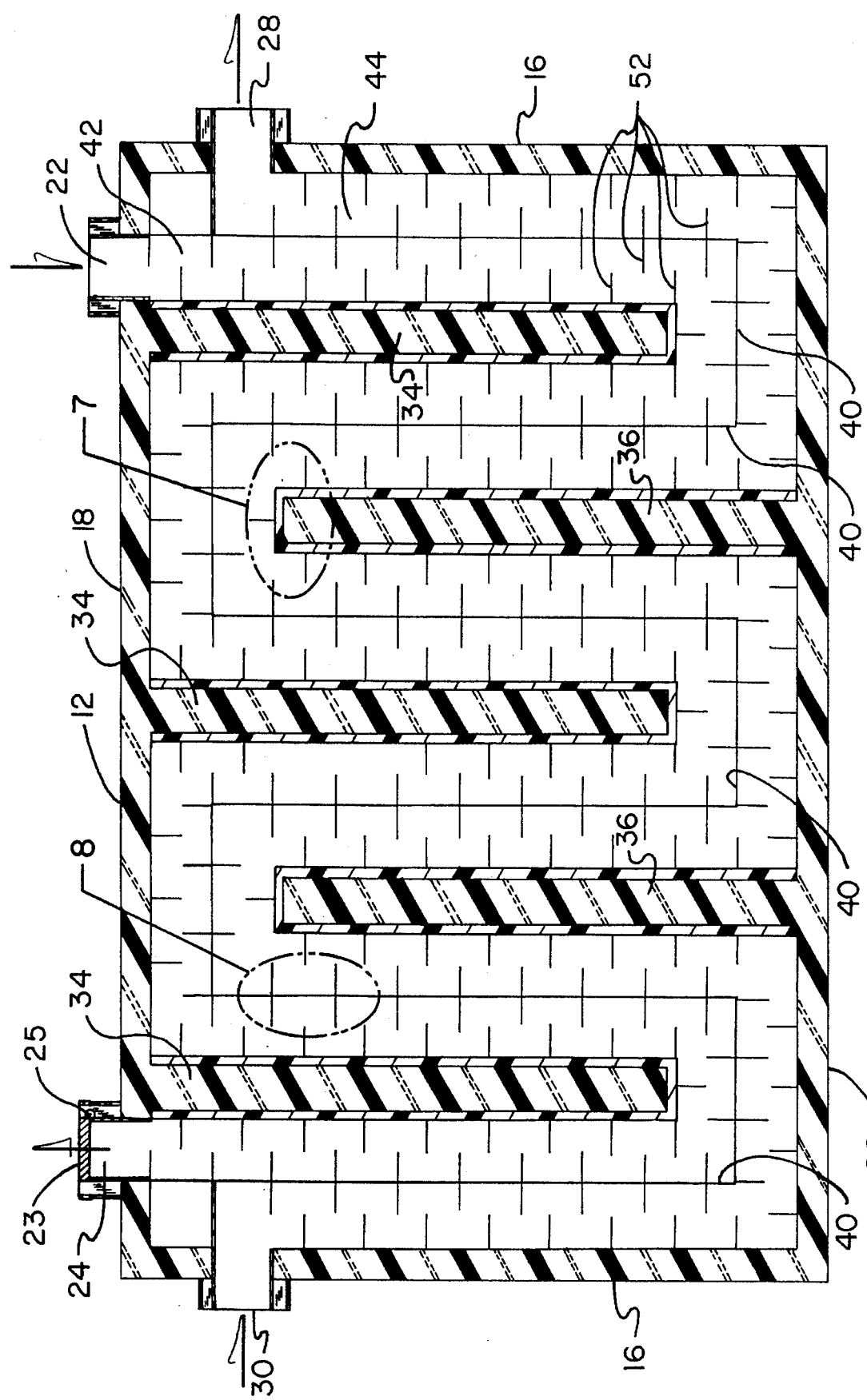
FIG. 6 is a cross-sectional view taken centrally through the length of the device of the prior Figure.
Figure 7:
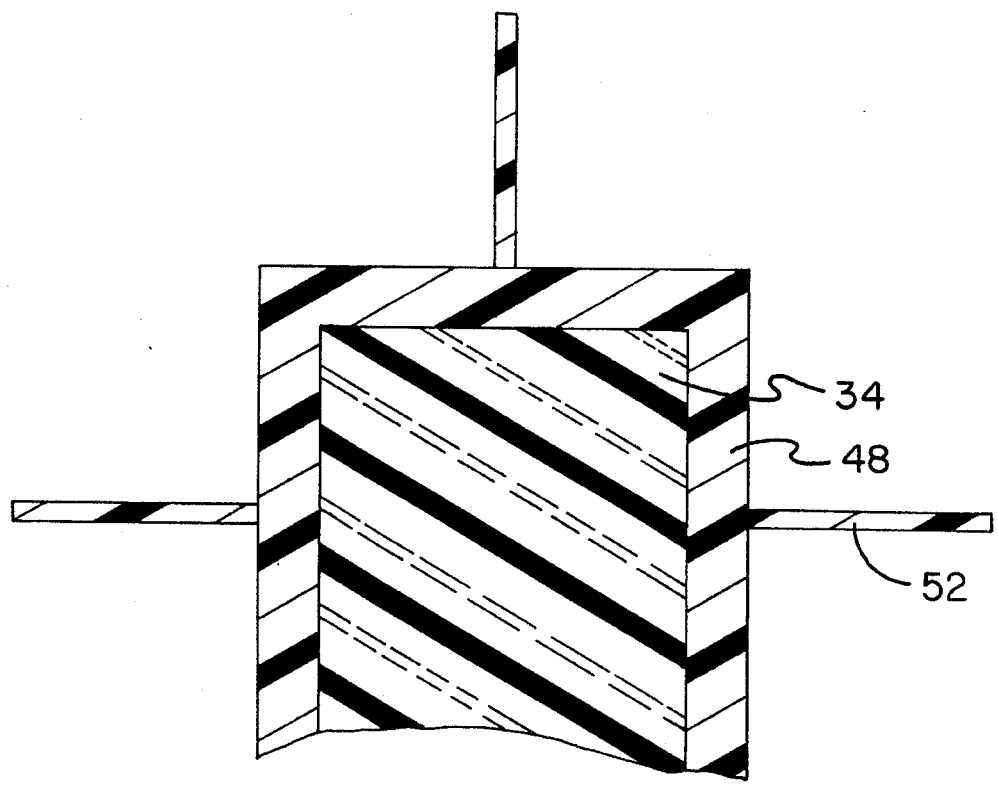
FIG. 7 is an enlarged cross-sectional view of a portion of FIG. 5 taken about oval 7 of FIG. 6.
Figure 8:
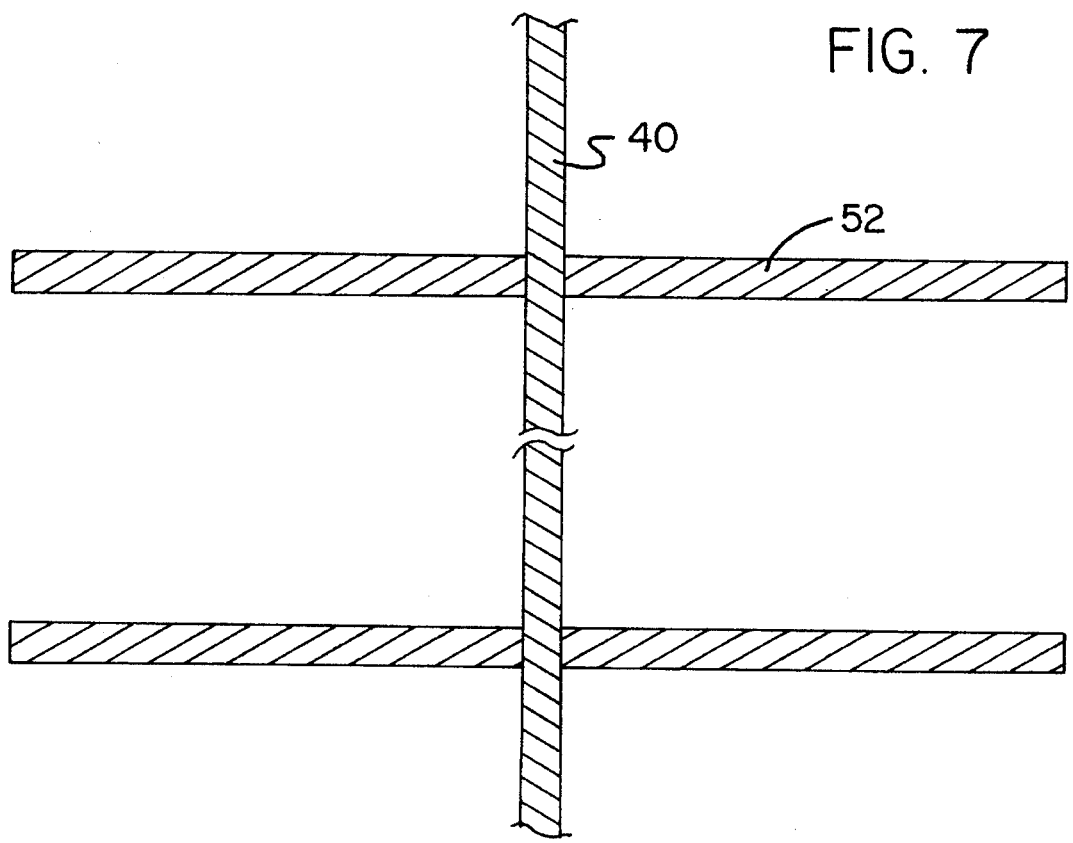
FIG. 8 is a cross-sectional view of a portion of the device taken at oval 8 of FIG. 6.

The central component of the system 10 of the present invention is a box 12. The box is in a generally rectangular configuration. It has large parallel side walls 14. It also has short parallel end walls 16. Such side and end walls are coupled together in a rectangular configuration. The box also has upper and lower parallel walls 18, 20. Such upper and lower walls couple the end and side walls to form the box with a space therebetween. The upper wall has a first aperture 22 adjacent to one end wall thereof. Such aperture is for the receipt of stale air from a building. The upper wall also has a second aperture 24 adjacent to the other end wall thereof. Such aperture is for the exhaust of stale air to exterior of the building. One of the openings, preferably the inside air exhaust opening 24 is formed with a pivotable door 23. Such door moves from a closed position as shown in FIGS. 1, 2, 4 and 6 to an open position allowing exhaust air from the house to be vented to the atmosphere. A spring 25 normally holds such door in the closed orientation. When, however, air is being transferred from one location to another, a positive pressure is built up within the unit to effect the opening of the door 23 from the opening 24 to allow such exhaust air to vent in the intended manner.

Next provided is a third aperture 28 in one of the end walls, the end wall adjacent to the first aperture. Such aperture is for the exhaust of fresh outside air into the home. A fourth aperture 30 is located in the other of the end walls, the end wall adjacent to the second aperture. Such aperture is for the receipt of fresh outside air.

Within the box are a plurality of downwardly extending spacer bars 34. Such spacer bars extend downwardly from the top wall interior of the device to a location spaced from the bottom wall. A plurality of upwardly extending walls 36 extend upwardly from the bottom wall to a location spaced from the top wall. These walls define a labyrinth within the box.

Next provided are a plurality of sheets of imperforate material coupled together to constitute a divider panel 40. Such panel is located within the box at the midpoint between the path of the labyrinth. Such panel functions to separate the labyrinth into two parallel flow paths. One flow path 42 extends from the first aperture to the second aperture. This flow path functions for the passage of stale air from the building to exterior of the building. A second flow path 44 extends from the fourth aperture to the third aperture. This is for the passage of fresh air from outside of the building to inside of the building. In this manner, the passage of air along the flow paths will effect the transfer of thermal energy from the air of one flow path to the air of the other flow path as the thermal energy is conducted through the divider panel. This constitutes a counter current heat exchanger.

The walls of the box and the spacer bars are fabricated of a thermally insulated material. A supplemental layer 48 of a thermal insulating layer may be coated on the divider panels for greater thermal insulation.

The divider panel is preferably fabricated of a thermally conductive material. This is to increase the exchange of heat between the fluids of the counteracting flow paths. A preferred material is sheet aluminum.

The last component of the system 10 are a plurality of laterally extending diverter plates 52. Such plates are located within each of the flow paths. Such plates function to provide turbulence to the air passing therethrough. This will increase the contact of the flow paths of air and thereby maximize the transfer of heat as desired.

The system 10 of the present invention is adapted to be used in association with any type of associated filter for air purification in the conventional manner. It is also preferably used in association with a fan or fans to facilitate the flow of air through the flow paths. In addition, it should be realized that any type of fluid could be used in practicing the invention not simply air.

Modern construction techniques can build homes that are very well insulated to minimize heating costs. The buildings must, of necessity, be almost airtight to avoid heat loss from infiltrating air. Airtight buildings, however, are not healthy! They do not provide enough fresh air for their human occupants who use up the oxygen and produce carbon dioxide, which makes them drowsy. They also trap pollutants such as fumes from smoke, paint, construction materials, furnishings and radon. What is needed is an air exchange system which can replace the stale air in the building with fresh air from outdoors without having to heat it or cool it.

The present invention does just that. It transfers heat from warm stale air from being exhausted, to the cool fresh air being drawn in. This could reduce the amount of heating or cooling required in the building. In either case it exchanges heat from one air stream to another.

The present invention is a heat exchanger for houses and apartments. While heat exchangers are available, they are large and expensive, and only suitable for large buildings, schools, offices and factories. The present invention is a smaller device that can be installed in any building whether it is heated by hot air, hot water, steam, electricity or even by coal or wood-burning stoves. It works with a fan, which draws outside air in and creates a slight positive pressure that forces stale air out. A filter could be placed on the outside air intake to remove pollen, dust and other particles, and the output of this device could go to a humidifier or dehumidifier before exiting into the building or its heating/cooling system.

The present invention is a countercurrent heat exchanger with two parallel labyrinthine paths separated by a thermally conductive material such as sheet aluminum. The paths are folded back on themselves to provide a long path in a small volume. As warm or hot air flows through one path it gives up some of its heat to the conductive divider which in turn heats the air flowing in the opposite direction through the outer path. The present invention is sized according to the maximum flow rate and temperature difference for a specific installation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved air renewal device comprising, in combination:

a box in a generally rectangular configuration, the box having large parallel side walls and short parallel end walls coupled in a rectangular configuration, the box also having upper and lower parallel walls coupling the end and side walls;

the upper wall having a first aperture adjacent to one end wall thereof for the receipt of stale air from a building and a second aperture adjacent to the other end wall thereof for the exhaust of stale air to exterior of the building;

a third aperture in one of the end walls adjacent to the first aperture for the exhaust of fresh outside air into the building and a fourth aperture in the other of the end walls adjacent to the second aperture for the receipt of fresh outside air;

a plurality of downwardly extending spacer bars extending downwardly from the top wall interior of the device to a location spaced from the bottom wall and a plurality of upwardly extending walls extending upwardly from the bottom wall to a location spaced from the top wall to thereby define a labyrinth within the box;

a divider panel located within the box at the midpoint between the path of the labyrinth thereby separating the labyrinth into two parallel flow paths, one flow path extending from the first aperture to the second aperture for the passage of stale air from the building to exterior of the building and a second flow path from the fourth aperture to the third aperture for the passage of fresh air from outside of the building to inside of the building whereby the passage of air along their flow paths will effect the transfer of thermal energy from the air of one flow path to the air of the other flow path as the thermal energy is conducted through the divider panel;

the walls of the box and the spacer bars being fabricated of a thermally insulated elastomeric material and the divider panel being fabricated of a thermally conductive material; and a plurality of laterally extending diverter plates extending laterally from the divider panel within each of the flow paths to provide turbulence to the air passing therethrough.

2. An air renewal device comprising:

a box in a generally rectangular configuration, the box having large parallel side walls and short parallel end walls coupled in a rectangular configuration, the box also having upper and lower parallel walls coupling the end and side walls;

one wall having a first aperture for the receipt of stale air from a building and a second aperture for the exhaust of stale air to exterior of the building;

a third aperture in one of the end walls adjacent to the first aperture for the exhaust of fresh outside air into the building and a fourth aperture adjacent to the second aperture for the receipt of fresh outside air;

a plurality of downwardly extending spacer bars extending downwardly from the top wall interior of the device to a location spaced from the bottom wall and a plurality of upwardly extending walls extending upwardly from the bottom wall to a location spaced from the top wall to thereby define a labyrinth within the box;

a divider panel located within the box at the midpoint between the path of the labyrinth thereby separating the labyrinth into two parallel flow paths, one flow path extending from the first aperture to the second aperture for the passage of stale air from the building to exterior of the building and a second flow path from the fourth aperture to the third aperture for the passage of fresh air from outside of the building to inside of the building whereby the passage of air along their flow paths will effect the transfer of thermal energy from the air of one flow path to the air of the other flow path as the thermal energy is conducted through the divider panel; and the walls of the box and the spacer bars being fabricated of a thermally insulated elastomeric material and the divider panel being fabricated of a thermally conductive material; and a plurality of laterally extending diverter plates extending laterally from the divider panel within each of the flow paths to provide turbulence to the air passing therethrough.

* * * * *